April 20, 1954     M. A. COTTER     2,675,858
CHILD'S SAFETY DEVICE
Filed Dec. 20, 1950
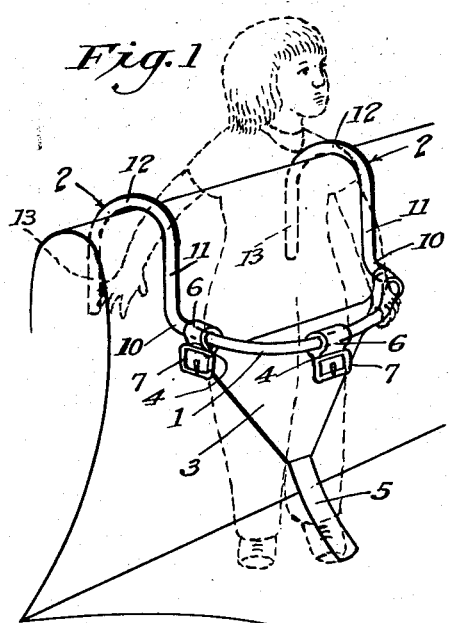
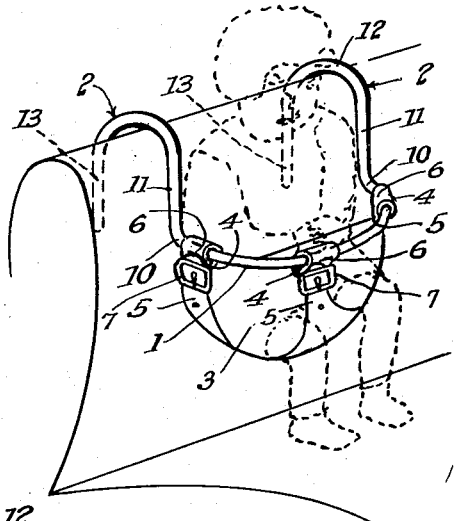
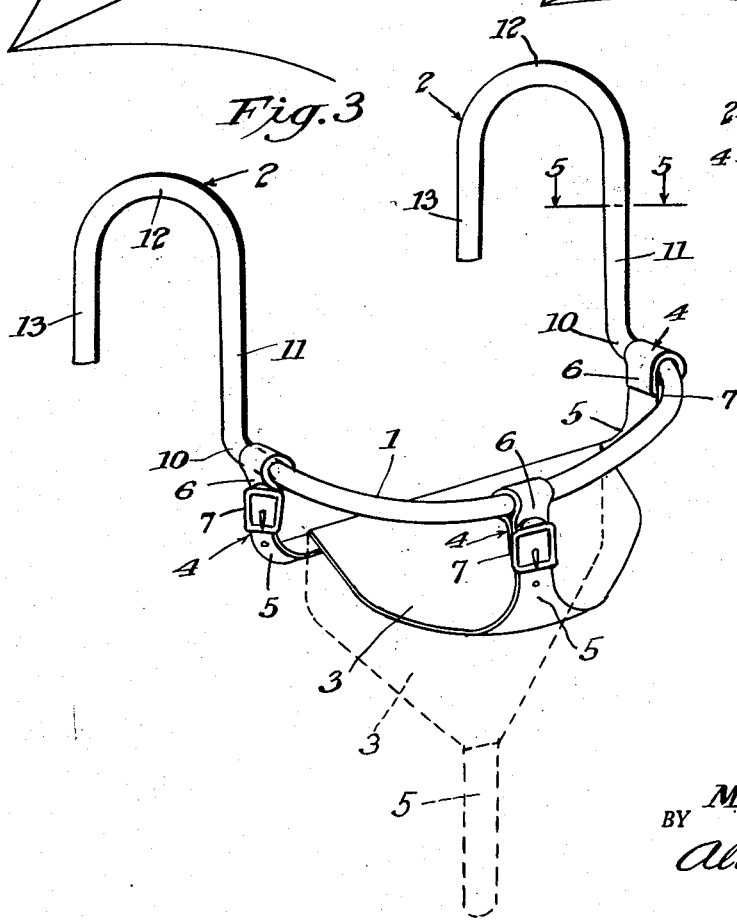
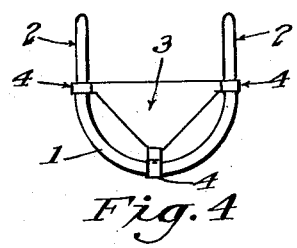
INVENTOR:
Milton A. Cotter,
BY Alan Franklin,
ATTORNEY.

Patented Apr. 20, 1954

2,675,858

UNITED STATES PATENT OFFICE 2,675,858

CHILD'S SAFETY DEVICE

Milton A. Cotter, Los Angeles, Calif.

Application December 20, 1950, Serial No. 201,821

2 Claims. (Cl. 155—79)

This invention relates to safety devices for children, and more particularly to a guard and an auxiliary seat for retaining young children in the seat of an automobile and thereby preventing said children from being thrown out of said seat while riding in the automobile.

Police and safety organizations are continually warning parents against allowing their children to stand up in the seat of an automobile, while riding therein, since many children have been hurt or seriously injured while riding in such manner in automobiles.

The general object of this invention is to provide a novel safety device comprising a combination automobile guard and auxiliary seat for children between the ages of two and six years which, device will retain such children in a sitting position, or in a standing position in the seat of an automobile and thereby protect such children against the possibility of being thrown out of the automobile seat against the dashboard or onto the floor of the automobile, in the event the automobile slows down or stops suddenly.

Other objects and advantages will appear hereinafter as this specification progresses.

The invention is illustrated in the annexed drawing, which forms a part of this specification, and in which:

Fig. 1 is a perspective view of my invention shown mounted in position on the seat of an automobile, with the auxiliary seat of my invention shown let down, and with a child standing up in my invention on the automobile seat.

Fig. 2 is a view like Fig. 1, except that the auxiliary seat of my invention is shown held up in its operative position with the child shown sitting in said auxiliary seat above the automobile seat, with the child's feet resting upon the automobile seat.

Fig. 3 is a perspective of my invention on an enlarged scale, shown detached from an automobile seat and with no child in the same.

Fig. 4 is a plan view of my invention.

Fig. 5 is a cross section taken on line 5—5 of the rod of Fig. 3 and the air hose through which said rod extends, which rod and hose are bent to form the guard and the automobile seat-engaging hooks of my invention.

Referring more particularly to the drawing, in which the same parts are designated by the same reference numerals in all of the views, my invention includes a forwardly extending arcuate guard 1; a pair of upwardly and rearwardly extending hooks 2 formed on the ends, respectively, of said guard; a three-cornered seat 3 of canvas or other suitable material; and three straps 4 connected at one end to the three corners, respectively, of said seat, and connected at their other ends to said guard 1. One corner of the seat 3 is connected by one of the straps 4 to the foremost portion of the guard 1 below said guard midway between the ends of the guard, at the rear thereof, while the other two corners of the seat 3 are connected by the other two straps 4 to the ends respectively of the guard 1, so that the rear edge of said seat extends between the ends of the guard 1 at the rear thereof and the two side edges of the seat extend from the ends of the guard at the sides thereof to the strap 4 at the foremost portion of the guard, midway between the ends thereof. Each of the straps 4 is made in two sections 5 and 6 connected together by a buckle 7 for adjusting the length of the straps, and for disconnecting the lower section 5 from the upper section 6 of the strap 4 at the foremost part of the guard 1 to let down the seat at its forward end for the purpose hereinafter described. The guard 1 and hooks 2 are formed of a single piece of steel rod 8, or other suitable material, extended through a rubber air hose 9, which rod and hose are first bent intermediate their ends in the form of an arc, forming the guard 1, then bent upwardly from the ends of said guard at the rear thereof as at 10 into upstanding forward arms 11, then bent rearwardly in the form of an arc 12 from the upper ends of said arms 11, and then downwardly from the rear ends of said arc portion into rearward depending arms 13, forming the hooks 2 at the rear of the guard 1.

The operation of my invention is as follows:

With my safety device removed from an automobile seat, a child steps into the device facing the guard 1 and straddling the seat 3 with his legs adjacent to the side edges of the seat, and the guard 1 extending around the front and sides of the child's body. My safety device and the child positioned therein are then placed on an automobile seat with the hooks 2 hooked over the upper edge of the back of an automobile seat and the upper arcuate bent portion 12 of the hooks resting upon the upper edge with the seat 3 of my safety device and the child sitting therein supported by said hooks 2 on the seat back above the automobile seat, as shown in Fig. 2 of the drawing.

By unbuckling the lower section 5 from the upper section 6 of the strap 4 connected to the foremost portion of guard 1, the seat 3 may be let down at its forward corner and suspended at its two rear corners by the two straps 4 which are connected to said two rear corners of said seat and to the rear ends of the guard 1, so that the child positioned in my safety device may stand up in the seat of the automobile as shown in Fig. 1 of the drawing.

When the seat is adjusted the child may stand up on the seat of the automobile without unbuckling the front corner of the seat 3, because of the flexibility of the seat which naturally folds between the child's legs as he stands up.

I claim:

1. A safety device as disclosed, including a forwardly-extending arcuate guard, a pair of hooks extending upwardly from the rear ends, respectively, of said guard to fit over the upper edge of the back of an automobile seat, a three-cornered auxiliary seat, two corners of said seat being connected to the end portions of said guard at the rear of said guard, and the third corner of said auxiliary seat being extended forwardly and detachably connected to the intermediate foremost portion of said guard.

2. A safety device as disclosed, including a guard, hooks extending upwardly from the rear ends, respectively, of said guard to fit over the upper edge of the back of an automobile seat, a three-cornered auxiliary seat including three straps, each of which straps is made in two sections, the inner section of two of said straps is connected to one corner of said auxiliary seat, the outer section of said two straps are connected to the ends, respectively, of said guard, the outer section of said third strap is connected to the foremost part of said guard, and a buckle connecting the inner section and the outer section of each of said straps, respectively.

References Cited in the file of this patent

UNITED STATES PATENTS

| Number | Name | Date |
|---|---|---|
| 97,315 | Randolph | Nov. 30, 1869 |
| 1,176,048 | Gentilella | Mar. 21, 1916 |
| 2,533,527 | Soltis | Dec. 12, 1950 |
| 2,538,324 | Petrie | Jan. 16, 1951 |
| 2,546,790 | Shook | Mar. 27, 1951 |
| 2,548,016 | Goldberg | Apr. 10, 1951 |

FOREIGN PATENTS

| Number | Country | Date |
|---|---|---|
| 72,741 | Norway | Oct. 27, 1947 |